P. HEAK.
WEANING-BITS.
No. 178,367. Patented June 6, 1876.
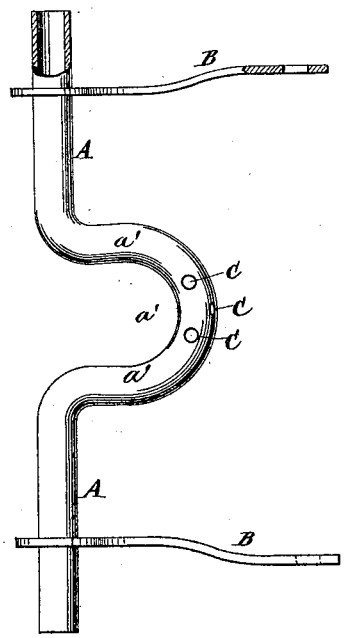

UNITED STATES PATENT OFFICE.

PHILIP HEAK, OF TOLEDO, IOWA.

IMPROVEMENT IN WEANING-BITS.

Specification forming part of Letters Patent No. 178,367, dated June 6, 1876; application filed April 25, 1876.

*To all whom it may concern:*

Be it known that I, PHILIP HEAK, of Toledo, in the county of Tama, and in the State of Iowa, have invented a new and Improved Calf-Weaning Bit, of which the following is a specification:

The figure is a top view of my improved bit, part being broken away to show the construction.

The object of this invention is to furnish an improved bit for calves and other animals, to prevent them from sucking.

The invention consists in the hollow bit, having a V-bend formed in its middle part, and perforated with a number of holes, and provided with the rigid arms, as hereinafter fully described.

A is a bit, which is made tubular and with a V-bend, $a'$, in its center, in which bend are formed a number of holes, C. The bit A is made of such a length that its ends may project at the sides of the animal's mouth. To the bit A, near its ends, are rigidly attached two arms, B, to which are attached the straps that secure it to the animal's head. The bit thus constructed is a double protection, for the teat will lie in the bend $a'$ of the bit, so that the animal cannot compress it, and the bit being hollow allows the air to pass into the animal's mouth, so that he cannot form a vacuum to draw out the milk. The rigid attachment of the arms B prevents the bit from turning in the animal's mouth and getting into such a position as not to be effective.

Having thus described my invention, what I claim as new, and desire to secure by Letters Patent, is—

The hollow bit A, having a V-bend, $a'$, formed in its middle part, and perforated with a number of holes, C, and provided with the rigid arms B, substantially as herein shown and described.

PHILIP HEAK.

Witnesses:
 WM. RIECKHOFF,
 F. A. JUNKER.